Sept. 2, 1930.  C. P. BROCKWAY  1,774,588
AIR CLEANER
Filed Sept. 9, 1920   3 Sheets-Sheet 1

Inventor
Carl P. Brockway
BY Chester W. Brockway
Attorney

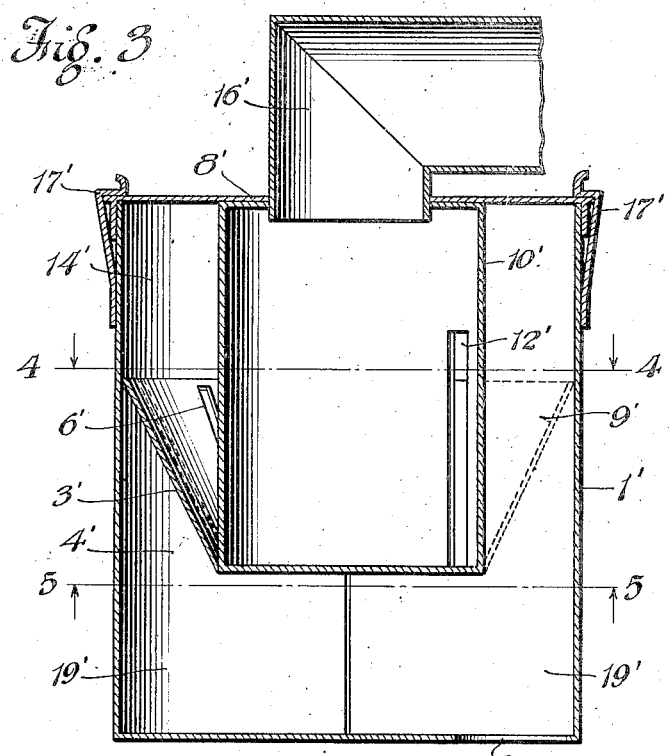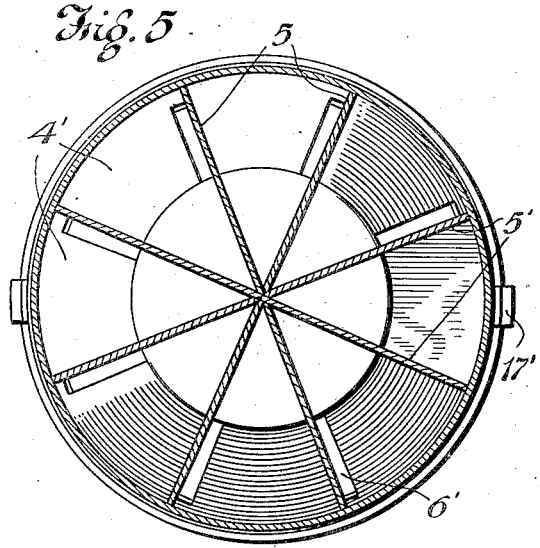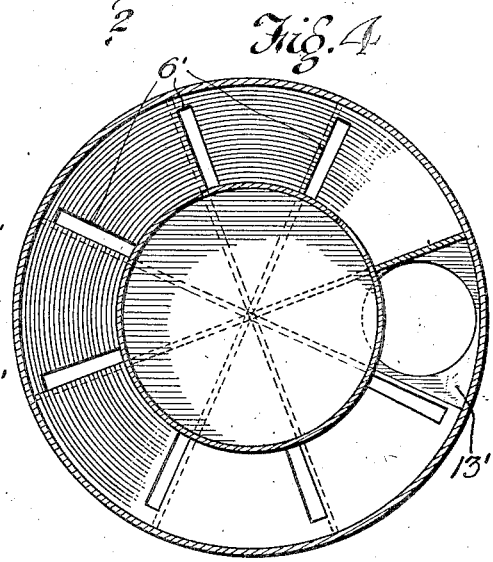

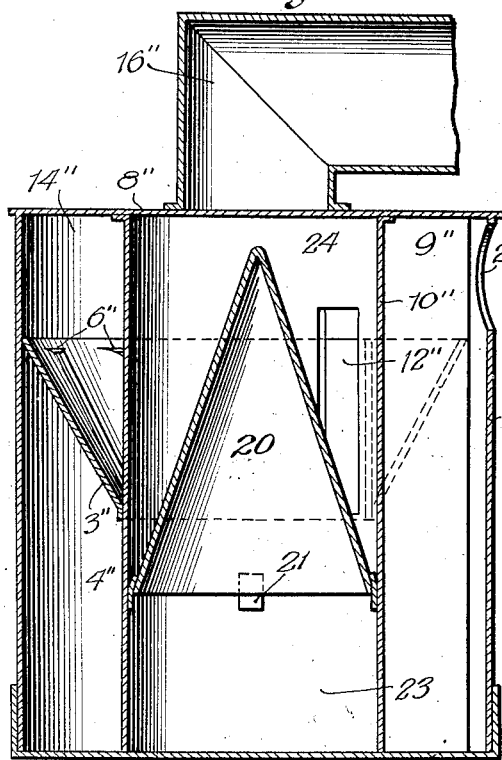
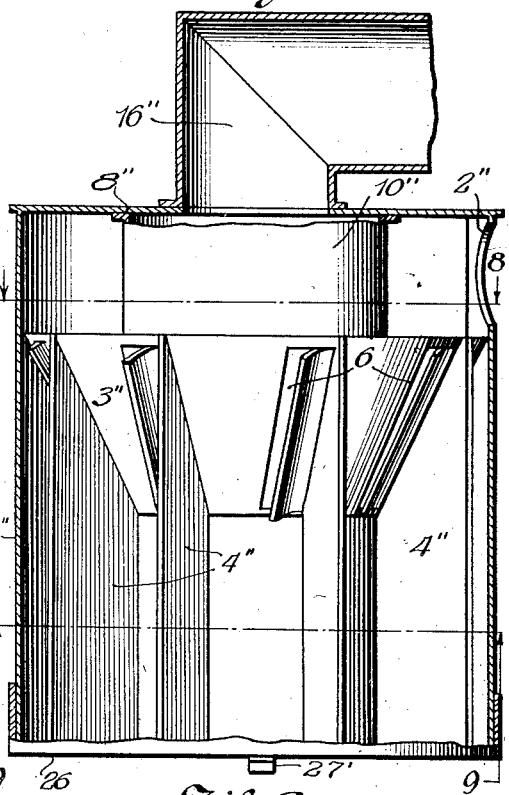
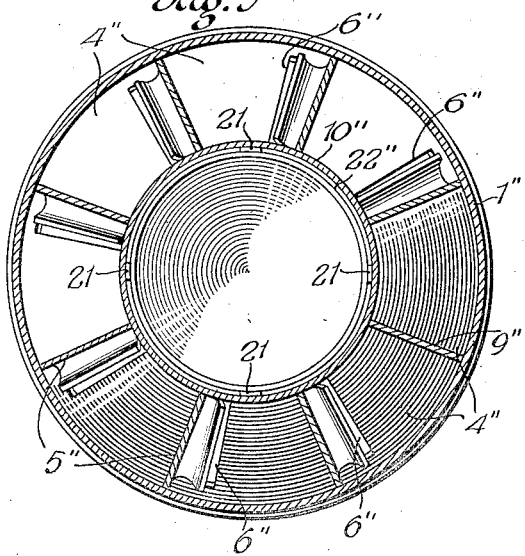
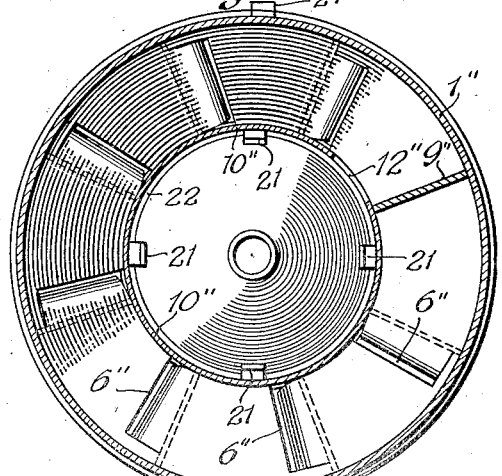

Patented Sept. 2, 1930

1,774,588

UNITED STATES PATENT OFFICE

CARL F. BROCKWAY, OF TOLEDO, OHIO, ASSIGNOR, BY MESNE ASSIGNMENTS, TO THE TILLOTSON MANUFACTURING COMPANY, OF TOLEDO, OHIO, A CORPORATION OF DELAWARE

AIR CLEANER

Application filed September 9, 1920. Serial No. 409,193.

My invention relates to the improvement of air cleaners or purifiers especially those such as are employed for cleaning air used in internal combustion engines, and has for its object to provide a cleaner wherein means are provided for causing solid or liquid impurities to be separated from the air by centrifugal force and to pass into dead air chambers wherein such particles gravitate to the bottom thereof, and means for removing such accumulation of dirt.

It is an especial object of my invention to provide a cylindrical casing with means therein to cause the entering air to circulate so that all heavy particles are thrown outward against the surface of the air passageway and pass through narrow openings therein into dead air pockets while the cleaned air passes to an outlet arranged near the center of the cylindrical casing.

A further object of my invention is to provide an air cleaner utilizing the higher specific gravity of the impurities to separate them from the pure air which is more efficient than those heretofore used.

A further object is to provide an efficient air cleaner which is of simple, light, and cheap construction.

These and other objects will appear as I proceed with a detailed description of the construction and operation of those specific embodiments of my invention which I have illustrated in the accompany drawings wherein:

Figure 3 is a vertical section of a modification.

Figure 4 is a horizontal section on the line 4—4 of Figure 3.

Figure 5 is a horizontal section on line 5—5 of Figure 3.

Figure 6 is a vertical section through another modification, and Figure 7 is a similar view but showing only the outside casing in section.

Figure 8 is a section on line 8—8 of Figure 7.

Figure 9 is a section on line 9—9 of Figure 7.

Similar numerals refer to similar parts throughout the several views.

Figure 1:
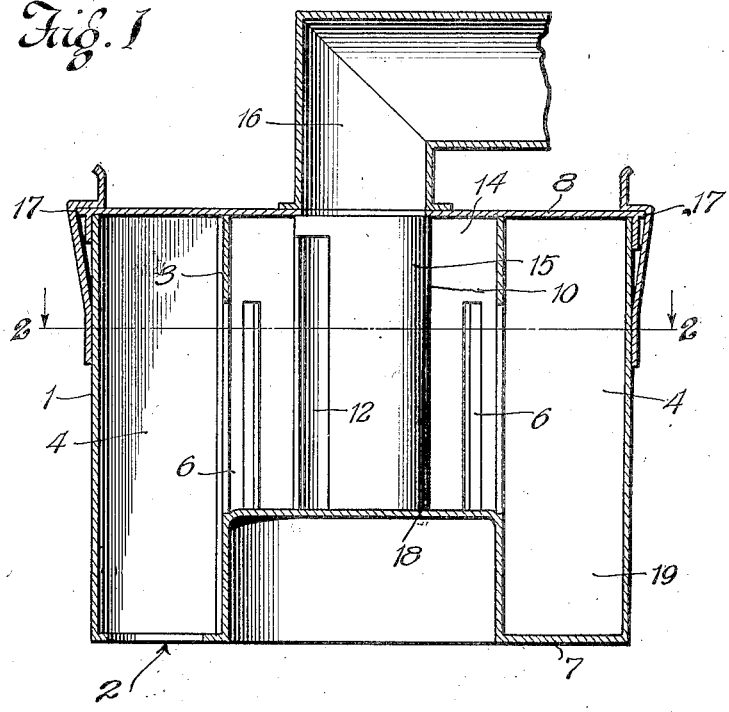
Figure 1 is a vertical section of one form of my improved air cleaner.
Figure 2:
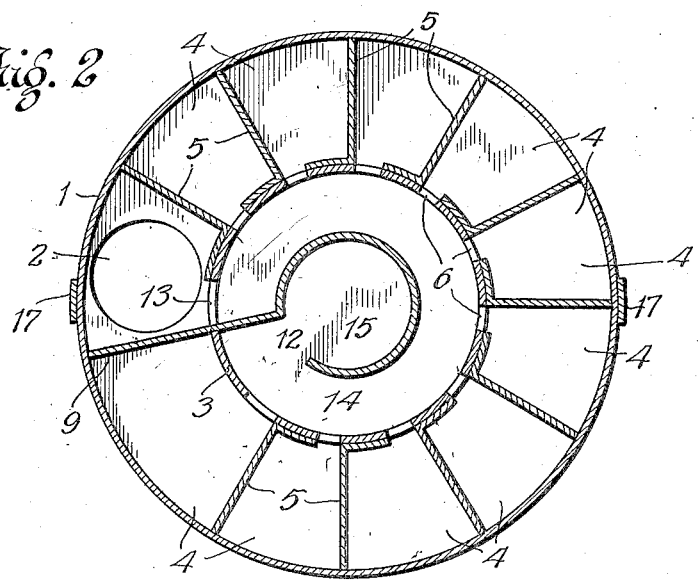
Figure 2 is a section on the line 2—2 of Fig. 1.

In Figures 1 and 2, 1 represents the outer cylindrical casing of the air cleaner, having an air inlet opening 2 in its bottom. 3 is an inner cylindrical casing concentric with the outer casing 1 and forming therewith an annular space which is divided up into a plurality of chambers 4 by the radial partitions 5 which are attached to the inner surface of the outer casing 1 and form substantially air tight connections with the bottom 7 and abut the top 8 of the outer casing 1. The radial partition 9 adjacent the air inlet opening 2 extends through a slot 13 in the inner casing 3 and is shaped into a cylinder 10 concentric with the inner casing 3 and forming therewith an annular passage 14 as shown in Figure 2. The cylinder 10 has an opening 12 therein adjacent the partition 9 and on the opposite side thereof from the air inlet 13. Thus the air upon entering at 2 passes to the passage 14 through the opening 13 and is required to travel a complete revolution before entering the opening 12. A series of slots 6 are cut in the casing 3, preferably just beyond each of the partitions 5, forming an opening into each of the chambers 4. Cylinder 10 is provided with an outlet pipe 16 rigidly attached to the top 8, and leads to the air intake of the carburetor, or other device to which cleaned air is desired to be supplied. The bottom 18 of the inner casing 3 is set up inside the cylinder substantially flush with the bottom of the slots 6, thus forming dead air pockets 19 within the lower part of each of the chambers 4. The casing 1 fits snugly within a depending flange on the top 8 and is held tightly up against the top by means of two or more spring fasteners 17 which catch over the projecting rim of top 8 as shown in Figure 1.

Now when air is drawn up through the inlet 2 it passes through opening 13 and is then whirled around the annular passage 14 through opening 12 into chamber 15 within cylinder 10; and thence out through outlet 16. In its rapid passage through 14 all solid or liquid impurities such as dust, dirt or unvaporized water are hurled by centrifugal force against the inner surface of casing 3 and flow along said surface until they reach one of the slots 6, and then through slots 6 into the chambers 4. A small amount of air will pass with the solid particles into the chambers 4 but its velocity is there dissipated in small eddies and the solid or liquid particles will settle to the bottom and collect in the dead air spaces 19.

When it is desired to empty the accumulated dirt from pockets 19, the entire unitary structure below top 8 is removed by releasing the spring catches 17 and the dirt can then be poured out.

In the modification of Figures 3, 4, and 5 the air enters through the inlet 2' and passes upward and above the conical member 3' through the opening 13' in said conical member. The space between the outer casing 1' and the bottom of the inner casing 10' and the lower surface of the conical member 3' is divided into a plurality of chambers 4' by the radial partitions 5'. A slot 6' through conical member 3' communicates with each of the chambers 4' adjacent the partition 5' which is on the near side in the direction of air travel. This structure permits relatively larger dead air pockets 19' below the level of the slots 6' in which the solid particles may settle out after such particles with a small amount of air have passed through the separating slots 6'. The incoming air through opening 13' is compelled to travel a complete revolution through passage 14' before entering 12' by partition 9' which extends all the way through passage 14' to the top 8'.

In the modifications shown in Figures 6, 7, 8, and 9 the air enters through an opening 2" near the top 8" of the cylindrical casing 1" and is compelled by partition 9" to travel completely around the inner cylinder 10" before entering opening 12". The openings 6" in the conical member 3" are shown as formed by slots cut in the member 3" and the lips turned downward as clearly shown in Figures 7 and 8. However, these slots may be otherwise formed, for instance, the lips may be attached to the opposite edge from that shown and bent upward so as to act as skimmers for deflecting the outermost layer of the dust laden air down into the pockets 4"; or they may be simple rectangular slots as shown in the other modifications. After the air enters opening 12" it still retains its whirling motion imparted to it in the passage 14" and it therefore sweeps with a spiral motion around the cone 20 up into the outlet 16". Cone 20 is fixed within the cylinder 10" by means of clips 21 and its base is of slightly smaller diameter than the cylinder 10", thus forming a narrow opening 22 between the space 24 above the cone and the dead air pocket 23. A further separation of the dirt particles which may have escaped entering the slots 6" takes place as the air spirals about the passage 24 and the dirt falls by gravity down through the opening 22 into the dead air pocket 23. By this combination a much more efficient separation is obtained than by a centrifugal separator with lateral slots or a cone shaped gravity separator alone. In this modification the collected dirt is emptied by removing the detachable bottom 26. The bottom 26 has an upturned flange which fits snugly over casing 1" and may be held in position by spring catches 27.

While I have described my invention in detail and as being embodied in certain forms, I do not desire or intend to be limited thereto, as it is obvious that the same may be varied without departing from the scope of the invention as defined in the appended claims.

I claim as my invention:

1. In an air cleaner of the character described, a chamber having an air inlet and outlet, means for giving the air a rotary motion within said chamber, a plurality of dead air pockets arranged upon the periphery of said chamber, having openings through the wall between said chamber and pockets whereby solid or liquid particles are separated from the air by centrifugal force, the length of said pockets being greater than that of the chamber and said openings extending to the base of the chamber, and said pockets extending below said chamber.

2. In an air cleaner, a chamber having an air inlet and outlet, means for giving the air a rotating motion within said chamber, a plurality of dead air pockets arranged about the periphery of said chamber, each of said pockets having an inlet opening but no outlet opening whereby solid or liquid particles are separated from the air by centrifugal force and settle out in said dead air pockets, the length of said pockets being greater than that of the chamber and said openings extending to the base of the chamber, and said pockets extending below said chamber.

3. An air cleaner comprising a chamber having an air inlet, means for rapidly rotating the air within said chamber, a plurality of dead air pockets having inlet openings arranged substantially in the periphery of said chamber, a second chamber having a conical baffle therein having its lower edge spaced from the walls of said second chamber to form an annular slot through which impurities in the air gravitate, a dead air pocket under said slot to receive the impurities, and means for passing the air through the first chamber and then through the second chamber, whereby the separation is obtained by centrifugal force in the first chamber and by gravity in the second chamber.

4. An air cleaner comprising a chamber having an inverted cone shaped bottom, means for rapidly rotating the air within said chamber, a plurality of dead air pockets having single inlet openings in the path of said rotating air arranged in said cone shaped bottom, whereby solid or liquid particles are separated from the air within said chamber both by centrifugal force and by gravity.

5. In an air chamber of the character described, a chamber having an air inlet and outlet, means for giving the air a rotary motion within said chamber, and a plurality of dead air pockets arranged upon the periphery of said chamber, having openings through the wall between said chamber and pockets extending approximately the full length thereof whereby solid or liquid particles are separated from the air by centrifugal force, said openings being positioned adjacent that side of the pocket first reached by the air in its rotary movement, said pockets having a length greater than the length of the chamber.

6. In an air cleaner, a chamber having an air inlet and outlet, means for giving the air a rotating motion within said chamber, a plurality of dead air pockets arranged about the periphery of said chamber, each of said pockets having an inlet opening extending approximately the full length of the wall between the chamber and the pockets but no outlet opening whereby solid or liquid particles are separated from the air by centrifugal force and settle out in said dead air pockets, said inlet openings being positioned adjacent that side of the pockets first reached by the air in its rotary movement, said pockets having a length greater than the length of the chamber.

7. In an air cleaner, a chamber having an air inlet and outlet, means for causing the air to rapidly rotate within said chamber, a dead air pocket arranged beyond the outer wall of said chamber, said pocket having an inlet passage leading from said chamber and extending approximately the full length of the wall between the chamber and the pocket, the passage being positioned in the chamber wall adjacent the front wall of the pocket when referred to the direction of air rotation, said pocket having a length greater than the length of the chamber.

8. In an air cleaner, a chamber having an air inlet and outlet, means for causing the air to rapidly rotate within said chamber, a dead air pocket arranged substantially beyond the periphery of said chamber, said pocket having an inlet opening extending approximately the full length of the wall between the chamber and pocket but no outlet opening, said inlet opening being connected with the periphery of said chamber adjacent the front wall of the pocket when referred to the direction of air rotation, said pocket having a length greater than the length of the chamber.

9. In an air cleaner, a chamber having an air inlet and outlet, means for rapidly rotating the air within said chamber, a dead air pocket arranged substantially beyond the periphery of said chamber, said pocket having only one opening extending approximately the full length of the wall between the chamber and pocket, said opening being positioned adjacent the front of said pocket when referred to the direction of air rotation and serving as an inlet for the heavier impurities hurled by centrifugal force from the air in said chamber.

In testimony whereof I affix my signature.

CARL P. BROCKWAY.